(12) United States Patent
Haley et al.

(10) Patent No.: US 11,795,331 B2
(45) Date of Patent: *Oct. 24, 2023

(54) CURABLE PHOTOCHROMIC COMPOSITIONS

(71) Applicant: Transitions Optical, Inc., Pinellas Park, FL (US)

(72) Inventors: Michael F. Haley, Glenshaw, PA (US); Linda K. Anderson, Allison Park, PA (US); Anthony T. Gestrich, Pittsburgh, PA (US); David B. Knowles, Apollo, PA (US); Stephen Robinson, Murrysville, PA (US); Feng Wang, Export, PA (US); Elizabeth A. Zezinka, Cranberry Township, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/177,322

(22) Filed: Feb. 17, 2021

(65) Prior Publication Data
US 2021/0163761 A1 Jun. 3, 2021

Related U.S. Application Data

(63) Continuation of application No. 15/746,068, filed as application No. PCT/US2015/045470 on Aug. 17, 2015, now Pat. No. 10,954,397.

(51) Int. Cl.
| | | |
|---|---|---|
| G02B 1/04 | (2006.01) |
| G02C 7/10 | (2006.01) |
| C08G 18/44 | (2006.01) |
| C08G 18/40 | (2006.01) |
| C09D 5/29 | (2006.01) |
| C08G 18/62 | (2006.01) |
| C08G 18/73 | (2006.01) |
| C08G 18/80 | (2006.01) |
| C08G 18/22 | (2006.01) |
| C08G 18/24 | (2006.01) |
| C09D 175/04 | (2006.01) |
| C08G 18/32 | (2006.01) |
| C08G 18/38 | (2006.01) |
| C08K 5/00 | (2006.01) |
| C08G 18/48 | (2006.01) |
| C09D 175/02 | (2006.01) |
| G02B 1/14 | (2015.01) |
| C08G 18/10 | (2006.01) |
| C08K 5/1545 | (2006.01) |

(52) U.S. Cl.
CPC ............ *C09D 5/29* (2013.01); *C08G 18/10* (2013.01); *C08G 18/227* (2013.01); *C08G 18/246* (2013.01); *C08G 18/3228* (2013.01); *C08G 18/3812* (2013.01); *C08G 18/4063* (2013.01); *C08G 18/44* (2013.01); *C08G 18/485* (2013.01); *C08G 18/6254* (2013.01); *C08G 18/73* (2013.01); *C08G 18/80* (2013.01); *C08G 18/807* (2013.01); *C08K 5/0041* (2013.01); *C08K 5/1545* (2013.01); *C09D 175/02* (2013.01); *C09D 175/04* (2013.01); *G02B 1/041* (2013.01); *G02B 1/14* (2015.01); *G02C 7/102* (2013.01)

(58) Field of Classification Search
CPC . C09D 5/19; G02B 1/041; G02B 1/14; G02C 7/102; C08K 5/0041; C08K 5/1545
See application file for complete search history.

(56) References Cited

U.S. PATENT DOCUMENTS

| | | |
|---|---|---|
| 4,160,853 A | 7/1979 | Ammons |
| 4,198,334 A | 4/1980 | Rasberger |
| 4,931,220 A | 6/1990 | Haynes et al. |
| 5,645,767 A | 7/1997 | Van Gemert |
| 5,658,501 A | 8/1997 | Kumar et al. |
| 6,187,444 B1 | 2/2001 | Bowles, III et al. |
| 6,474,695 B1 | 11/2002 | Schneider et al. |
| 6,589,452 B2 | 7/2003 | Asher et al. |
| 6,916,537 B2 | 7/2005 | Welch et al. |
| 7,410,691 B2 | 8/2008 | Blackburn et al. |
| 8,608,988 B2 | 12/2013 | Bowles et al. |
| 2002/0123644 A1 | 9/2002 | Kitai et al. |
| 2002/0142248 A1 | 10/2002 | Dubois et al. |
| 2003/0136948 A1 | 7/2003 | Welch et al. |
| 2003/0174560 A1 | 9/2003 | Dahmen et al. |

(Continued)

FOREIGN PATENT DOCUMENTS

| | | |
|---|---|---|
| CN | 1223724 A | 7/1999 |
| CN | 1596289 A | 3/2005 |

(Continued)

OTHER PUBLICATIONS

Carter et al., "Synthesis of Amine-Terminated Aliphatic Polycarbonates via Al(Et)2(OR)—Initiated Polymerizations", Macromolecules, 1997, pp. 6074-6076, vol. 30.

(Continued)

Primary Examiner — Michael L Leonard
(74) Attorney, Agent, or Firm — THE WEBB LAW FIRM

(57) ABSTRACT

A curable photochromic composition can include: (a) a first component having a first compound with at least two active hydrogen-functional groups and an active hydrogen-functional group equivalent weight of at least 1000; (b) a second component having at least one of a polyisocyanate and a blocked polyisocyanate; and (c) at least one photochromic compound. The ratio of total isocyanate and blocked isocyanate group equivalents of the second component to total active hydrogen-functional group equivalents is at least 4:1.

24 Claims, No Drawings

(56) References Cited

U.S. PATENT DOCUMENTS

| | | |
|---|---|---|
| 2005/0233153 A1 | 10/2005 | Qin et al. |
| 2007/0142603 A1 | 6/2007 | Rukavina |
| 2007/0259117 A1 | 11/2007 | Archey et al. |
| 2009/0176945 A1 | 7/2009 | Bojkova et al. |
| 2010/0119802 A1 | 5/2010 | Ford et al. |
| 2012/0212840 A1 | 8/2012 | Bowles et al. |
| 2014/0199524 A1 | 7/2014 | Rukavina |

FOREIGN PATENT DOCUMENTS

| | | |
|---|---|---|
| CN | 1596291 A | 3/2005 |
| CN | 101512386 A | 8/2009 |
| EP | 1602479 A1 | 12/2005 |
| WO | 2005023529 A2 | 3/2005 |

OTHER PUBLICATIONS

Kiatsimkul et al., "Preparation of high hydroxyl equivalent weight polyols from vegetable oils", Industrial Crops and Products, May 2008, pp. 257-264, vol. 27:3.

Lu et al., "A Convenient Method for the Synthesis of Amine-Terminated Poly(ethylene oxide) and Poly(ethylene caprolactone)", Bioconjugate Chem., 2002, pp. 1159-1162, vol. 13.

Pariani et al., "Photochromic polyurethanes for rewritable CGHs in optical testing", Optics Express, 2011, pp. 4536-4541, vol. 19:5.

Rongping et al., "Research on the photochromic compounds and photochromic coating", China Building Materials Science and Technology, 2014, pp. 36-38, No. 2.

CURABLE PHOTOCHROMIC COMPOSITIONS

CROSS REFERENCE TO RELATED APPLICATIONS

This application is a continuation application of U.S. application Ser. No. 15/746,068, filed Jan. 19, 2018, which is the United States national phase of International Application No. PCT/US2015/045470, filed Aug. 17, 2015, the disclosures of which are hereby incorporated in their entirety by reference.

FIELD OF THE INVENTION

The present invention relates generally to curable photochromic compositions and photochromic articles having at least one coating layer formed from the curable photochromic compositions.

BACKGROUND OF THE INVENTION

Photochromic compounds undergo a transformation from one form or state to another form in response to radiation. Typically, upon exposure to actinic radiation, many photochromic compounds are transformed from a closed-form, which corresponds to an unactivated state of the photochromic compounds, to an open-form, which corresponds to an activated (or colored) state of the photochromic compounds. In the absence of exposure to actinic radiation, such photochromic materials are reversibly transformed from the activated (or colored) state, back to the unactivated (or bleached) state. As such, photochromic compounds can be incorporated into a coating and applied to a substrate to provide a reversible change in color when exposed to radiation such as ultraviolet light.

Because of their ability to change color when exposed to radiation, photochromic coatings are often applied over optical articles to reduce the transmission of incident light into the eye. For instance, photochromic coatings are commonly applied over sunglasses, vision correcting ophthalmic lenses, fashion lenses, e.g., non-prescription and prescription lenses, sport masks, face shields, goggles, visors, camera lenses, windows, and automotive windshields.

Photochromic coatings generally have a homogeneous polymeric matrix, with photochromic compounds evenly distributed within the matrix. As photochromic compounds undergo a change in conformation upon exposure to radiation, the hardness of the matrix affects the speed at which the compounds can exhibit photochromic activity. Thus, by reducing the hardness of the matrix, it is possible to increase the speed at which the photochromic compounds are activated and unactivated. However, it would be desirable to improve photochromic performance without compromising the hardness of the coating itself.

SUMMARY OF THE INVENTION

The present invention is directed to a curable photochromic composition. The curable photochromic composition includes: (a) a first component comprising a first compound having at least two active hydrogen-functional groups and an active hydrogen-functional group equivalent weight of at least 1000; (b) a second component comprising at least one of a polyisocyanate and a blocked polyisocyanate; and (c) at least one photochromic compound, wherein the ratio of total isocyanate and blocked isocyanate group equivalents in the second component to total active hydrogen-functional group equivalents is at least 4:1.

The present invention is also directed to a photochromic article that includes (a) a substrate and (b) at least one coating layer formed from a curable photochromic composition residing over at least a portion of the substrate.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise.

All documents, such as, but not limited to, issued patents and patent applications, referred to herein, and unless otherwise indicated, are to be considered to be "incorporated by reference" in their entirety.

As used herein, molecular weight values of polymers, such as weight average molecular weights (Mw) and number average molecular weights (Mn), are determined by gel permeation chromatography using appropriate standards, such as polystyrene standards, and glass transitions temperatures (Tg) are determined using differential scanning calorimetry (DSC) or dynamic mechanical analysis (DMA).

As used herein, polydispersity index (PDI) values represent a ratio of the weight average molecular weight (Mw) to the number average molecular weight (Mn) of the polymer (i.e., Mw/Mn).

As used herein, the term "active hydrogen-functional group" refers to a functional group containing a hydrogen atom that displays a significant degree of reactivity, such as towards an isocyanate group (NCO). Non-limiting examples of active hydrogen-functional groups include hydroxyls, primary amines, secondary amines, thiols (also referred to as mercaptans), and combinations thereof.

The term "active hydrogen-functional group equivalent weight" refers to the average molecular weight per active hydrogen-functional group and can be determined in accordance with art-recognized methods, such as by $^1$H NMR or analytical titration.

A "polyol" refers to an organic molecule having an average of greater than 1.0 hydroxyl groups per molecule. Thus, a polycarbonate polyol, a polyether polyol, a polyester polyol, a polyamide polyol, and the like refer to a polycarbonate, a polyether, a polyester, and a polyamide polymer having an average of greater than 1.0 hydroxyl group, such as at least two hydroxyl groups.

As used herein, the term "polymer" means homopolymers (e.g., prepared from a single monomer species), copolymers (e.g., prepared from at least two monomer species), and graft polymers.

As used herein, a "polyisocyanate" refers to a molecule comprising more than one isocyanate (NCO) functional group. A "blocked polyisocyanate" refers to a polyisocyanate in which the isocyanate groups are protected by a blocking agent such as β-diketone, phenol, 3,5-dimethylpyrazole, cresol, epsilon-caprolactam, and methyl ethyl ketoxime, for example, which can de-block under certain conditions, such as elevated temperatures.

As used herein, the term "(meth)acrylate" and similar terms, such as "(meth)acrylic acid ester" means methacrylates and/or acrylates. As used herein, the term "(meth)acrylic acid" means methacrylic acid and/or acrylic acid.

As used herein, a "soft segment domain" refers to a domain having a glass transition temperature (Tg) of equal to or less than –10° C. Further, a "hard segment domain" refers to a domain having a Tg of at least 0° C.

As used herein, recitations of "linear or branched" groups, such as linear or branched alkyl, are herein understood to include: a methylene group or a methyl group; groups that are linear, such as linear $C_2$-$C_{36}$ alkyl groups; and groups that are appropriately branched, such as branched $C_3$-$C_{36}$ alkyl groups.

As used herein, recitations of "optionally substituted" group, means a group including, but not limited to, alkyl group, cycloalkyl group, heterocycloalkyl group, aryl group, and/or heteroaryl group, in which at least one hydrogen thereof has been optionally replaced or substituted with a group that is other than hydrogen, such as, but not limited to, halo groups (e.g., F, Cl, I, and Br), hydroxyl groups, ether groups, thiol groups, thio ether groups, carboxylic acid groups, carboxylic acid ester groups, phosphoric acid groups, phosphoric acid ester groups, sulfonic acid groups, sulfonic acid ester groups, nitro groups, cyano groups, hydrocarbyl groups (including, but not limited to: alkyl; alkenyl; alkynyl; cycloalkyl, including poly-fused-ring cycloalkyl and polycycloalkyl; heterocycloalkyl; aryl, including hydroxyl substituted aryl, such as phenol, and including poly-fused-ring aryl; heteroaryl, including poly-fused-ring heteroaryl; and aralkyl groups), and amine groups, such as $N(R_{11}')(R_{12}')$ where $R_{11}'$ and $R_{12}'$ can each be independently selected from hydrogen, linear or branched $C_1$-$C_{20}$ alkyl, $C_3$-$C_{12}$ cycloalkyl, $C_3$-$C_{12}$ heterocycloalkyl, aryl, and heteroaryl.

The term "alkyl" as used herein means linear or branched alkyl, such as, but not limited to, linear or branched $C_1$-$C_{25}$ alkyl, or linear or branched $C_1$-$C_{10}$ alkyl, or linear or branched $C_2$-$C_{10}$ alkyl. Examples of alkyl groups from which the various alkyl groups of the present invention can be selected from include, but are not limited to, those recited previously herein. Alkyl groups of the various compounds of the present invention can include one or more unsaturated linkages selected from —CH═CH— groups and/or one or more —C≡C— groups, provided the alkyl group is free of two or more conjugated unsaturated linkages. The alkyl groups can be free of unsaturated linkages, such as CH═CH groups and —C≡C— groups.

The term "cycloalkyl" as used herein means groups that are appropriately cyclic, such as, but not limited to, $C_3$-$C_{12}$ cycloalkyl (including, but not limited to, cyclic $C_5$-$C_7$ alkyl) groups. Examples of cycloalkyl groups include, but are not limited to, those recited previously herein. The term "cycloalkyl" as used herein also includes: bridged ring polycycloalkyl groups (or bridged ring polycyclic alkyl groups), such as, but not limited to, bicyclo[2.2.1]heptyl (or norbornyl) and bicyclo[2.2.2]octyl; and fused ring polycycloalkyl groups (or fused ring polycyclic alkyl groups), such as, but not limited to, octahydro-1H-indenyl and decahydronaphthalenyl.

The term "heterocycloalkyl" as used herein means groups that are appropriately cyclic (having at least one heteroatom in the cyclic ring), such as, but not limited to, $C_3$-$C_{12}$ heterocycloalkyl groups or $C_5$-$C_7$ heterocycloalkyl groups, and which have at least one heteroatom in the cyclic ring, such as, but not limited to, O, S, N, P, and combinations thereof. Examples of heterocycloalkyl groups include, but are not limited to, imidazolyl, tetrahydrofuranyl, tetrahydropyranyl, and piperidinyl. The term "heterocycloalkyl" as used herein can also include: bridged ring polycyclic heterocycloalkyl groups, such as, but not limited to, 7-oxabicyclo[2.2.1]heptanyl; and fused ring polycyclic heterocycloalkyl groups, such as, but not limited to, octahydrocyclopenta[b]pyranyl and octahydro 1H isochromenyl.

As used herein, the term "aryl" includes $C_5$-$C_{18}$ aryl, such as $C_5$-$C_{10}$ aryl (and includes polycyclic aryl groups, including polycyclic fused ring aryl groups). Representative aryl groups include, but are not limited to, phenyl, naphthyl, anthracenyl, and triptycenyl.

The term "heteroaryl" as used herein means aryl groups having at least one heteroatom in the ring, and includes, but is not limited to, $C_5$-$C_{18}$ heteroaryl, such as, but not limited to, $C_5$-$C_{10}$ heteroaryl (including fused ring polycyclic heteroaryl groups) and means an aryl group having at least one heteroatom in the aromatic ring, or in at least one aromatic ring in the case of a fused ring polycyclic heteroaryl group. Examples of heteroaryl groups include, but are not limited to, furanyl, pyranyl, pyridinyl, isoquinoline, and pyrimidinyl.

As used herein, the term "fused ring polycyclic-aryl-alkyl group" and similar terms, such as fused ring polycyclicalkyl-aryl group, fused ring polycyclo-aryl-alkyl group, and fused ring polycyclo-alkyl-aryl group means a fused ring polycyclic group that includes at least one aryl ring and at least one cycloalkyl ring that are fused together to form a fused ring structure. For purposes of non-limiting illustration, examples of fused ring polycyclic-aryl-alkyl groups include, but are not limited to, indenyl, 9H-flourenyl, cyclopentanaphthenyl, and indacenyl.

The term "aralkyl" as used herein includes, but is not limited to, $C_6$-$C_{24}$ aralkyl, such as, but not limited to, $C_6$-$C_{10}$ aralkyl, and means an aryl group substituted with an alkyl group. Examples of aralkyl groups include, but are not limited to, those recited previously herein.

Further, the term "alkylene" refers to a linear or branched divalent hydrocarbon radical. The alkylene group may include, but is not limited to, a linear or branched $C_1$-$C_{30}$ divalent hydrocarbon radical, or linear or branched $C_1$-$C_{20}$ divalent hydrocarbon radical, or linear or branched $C_1$-$C_{10}$ divalent hydrocarbon radical. Alkylene groups of the various compounds of the present invention can include one or more unsaturated linkages selected from —CH═CH— groups and/or one or more —C≡C— groups, provided the alkylene group is free of two or more conjugated unsaturated linkages. Alternatively, the alkylene groups are free of any unsaturated linkages, such as CH═CH groups and —C≡C— groups.

The term "photochromic" refers to the capability to change color upon exposure to radiant energy such as upon exposure to visible light, for example. Thus, a "photochromic composition" refers to a composition that is capable of changing color upon exposure to radiant energy such as upon exposure to visible light, for example.

The term "curable", "cure", "cured" or similar terms, as used in connection with a cured or curable composition, is intended to mean that at least a portion of the polymerizable and/or crosslinkable components that form the curable composition are at least partially polymerized and/or crosslinked. The degree of crosslinking can range from 5% to 100% of complete crosslinking. The degree of crosslinking can range from 30% to 95%, such as 35% to 95%, or 50% to 95%, or 50% to 85% of full crosslinking. The degree of crosslinking can range between any combination of the previously stated values, inclusive of the recited values, and can be determined in accordance with art-recognized methods, such as, but not limited to, solvent-extraction methods.

The term "substrate" means an article having at least one surface that is capable of accommodating a curable photochromic composition; namely, the substrate has a surface to which a curable photochromic composition can be applied. The shape of the surface of the substrate can include round, flat, cylindrical, spherical, planar, substantially planar, plano-concave and/or plano-convex, curved, including, but not limited to, convex, and/or concave.

The terms "optical", "optically clear", or like terms mean that the specified material, e.g., substrate, film, coating, etc., exhibits a light transmission value (transmits incident light) of at least 4%, and exhibits a haze value of less than 1%, e.g., a haze value of less than 0.5%, when measured at 550 nanometers by, for example, a Haze Gard Plus Instrument.

The phrase "at least partially coated" means an amount of coating covering from a portion to the complete surface of a substrate.

As previously noted, the present invention is directed to a curable photochromic composition. The curable photochromic composition can include a first component having a first compound with at least two active hydrogen-functional groups. The active hydrogen-functional groups that can be used with the first compound include, but are not limited to, hydroxyls, primary amines, secondary amines, thiols (also referred to as mercaptan), and combinations thereof. The active hydrogen-functional groups that can be used with the compositions of the present invention can have an active-hydrogen equivalent weight of at least 1,000, at least 1,500, at least 2,000, at least 2,500, or at least 5,000.

Non-limiting examples of compounds comprising at least two hydroxyl groups and which can be used as the first compound include various types of polyols comprising at least two hydroxyl groups. The polyols can include, but are not limited to, polycarbonate polyols, polyether polyols, polyester polyols, and combinations thereof.

Suitable polycarbonate polyols can be obtained, for example, by isolating higher molecular weight polycarbonate functional polyols from mixtures of polycarbonate functional polyols having a high polydispersity index. For example, the polycarbonate functional polyols can be obtained by isolating higher molecular weight polycarbonate functional polyols from a mixture of aliphatic polycarbonate polyols commercially available as PC-1122 from Stahl USA, ETERACOLL™ PH-200D, PH-200, and UH-200 all from Ube Chemical. Other suitable polycarbonate polyols are commercially available from Asahi under the trade name DURANOL™ T5652.

The polycarbonate functional polyol can be purified by washing the mixture with methanol or other suitable solvent and removing the low molecular weight fractions until the polydispersity index of the remaining sample is less than or equal to 1.50.

Further, ester linkages may be added along the backbone of the polycarbonate polyol. Extension of the polycarbonate with polyester functionality may be done using a Lewis acid catalyst (such as, but not limited to, tin(II) ethylhexanoate, triethyl aluminum, diphenyl phosphate, tri-isopropoxide aluminum, Borchi Kat® 22, dibutyltin(IV) dilaurate, etc.) or amine catalyst (such as, but not limited to, 1,3,4,6,7,8-hexahydro-2H-pyrimido[1,2-a]-pyrimidine) by means of ring opening polymerizations (ROP). Extending the molecular weight of the polycarbonate includes the use of ester by reacting the polycarbonate simultaneously with lactone using ROP in the presence of a Lewis acid catalyst such as those described previously.

Non-limiting examples of suitable polyether polyols include polyoxyalkylene polyols and polyalkoxylated polyols, such as, for example, the poly(oxytetramethylene)diols. The polyoxyalkylene polyols can be prepared according to methods known in the art, such as by condensing alkylene oxide, or a mixture of alkylene oxides using acid or base catalyzed addition, with a polyhydric initiator or a mixture of polyhydric initiators such as ethylene glycol, propylene glycol, glycerol, sorbitol, and the like. Illustrative alkylene oxides include ethylene oxide, propylene oxide, butylene oxide, amylene oxide, aralkylene oxides, e.g., styrene oxide and the halogenated alkylene oxides such as trichlorobutylene oxide. Examples of polyoxyalkylene polyols include polyoxyethylene (i.e., polyethylene glycol) with a molecular weight of greater than 2000, polyoxypropylene (i.e., polypropylene glycol) with a molecular weight of greater than 2000, polytetramethylene ether glycol, and combinations thereof. Ester linkages may also be added along the backbone of the polyether polyol using the conditions previously described. Non-limiting examples of commercially available polyether polyols include those available from Dow Chemicals under the VORANOL™ trade name, from BASF under the LUPRANOL®, PLURACOL®, PLURONIC®, and PolyTHF® trade names, and from Bayer under the DESMOPHEN® and ACCLAIM® trade names.

Non-limiting examples of suitable polyester polyols can include those prepared with polyols including, but not limited to, the previously described polyols with polycarboxylic acids. Non-limiting examples of suitable polycarboxylic acids include phthalic acid, isophthalic acid, terephthalic acid, trimellitic acid, tetrahydrophthalic acid, adipic acid, succinic acid, glutaric acid, fumaric acid, and combinations thereof. Anhydrides of the above acids, where they exist, can also be employed and are encompassed by the term "polycarboxylic acid". In addition, certain materials which react in a manner similar to acids to form polyester polyols can also be used. Non-limiting examples of such materials include lactones, such as caprolactone, propiolactone, and butyrolactone, and hydroxy acids, such as hydroxycaproic acid and dimethylol propionic acid. Moreover, as used herein, the polyester polyols can also include polyester polyols modified with fatty acids or glyceride oils of fatty acids. The polyester polyol can also be prepared by reacting an alkylene oxide, such ethylene oxide, propylene oxide, and the like, and the glycidyl esters of versatic acid with methacrylic acid to form the corresponding ester. Suitable polyester polyols can also include polyester diols such as polycaprolactone diol. Non-limiting examples of commercially available polyester polyols include those available from BASF under the LUPRAPHEN® trade name, or from Evonik Industries under the DYNACOLL® trade name, or from Bayer under the DESMOPHEN® and BAYCOLL® trade names.

As previously described, the active hydrogen-functional groups of the first compound can also include primary and/or secondary amine groups. As such, the first compound can include polyamine compounds. For example, the first compound can include, but is not limited to, polycarbonate amines, polyester amines, polyether amines, and combinations thereof.

Suitable polycarbonate amines and polyester amines that can be used as the first compound can be synthesized using various methods known in the art. For instance, suitable polycarbonate diamines can be prepared by using a nitrophenyl functionalized initiator for the ring opening of trimethylene carbonate followed by reduction to the amine as described in Macromolecules, 1997, 30, 6074, which is incorporated by reference herein. Further, suitable polyester diamines can be prepared by the condensation of hydroxyl terminated polyesters with N-benzyloxycarbonyl amino acid followed by catalytic hydrogenation to produce the amine as described in Bioconjugate Chemistry, 2002, 13(5), 1159-1162, which is incorporated by reference herein.

Non-limiting examples of polyether amines include those commercially available from Huntsman under the trade names JEFFAMINE® D-2000, JEFFAMINE® D-4000, JEFFAMINE® ED-2003, JEFFAMINE® T-5000, and JEFFAMINE® SD-2001.

In addition to the first component, the photochromic composition can also include a second component comprising a polyisocyanate and/or a blocked polyisocyanate. The polyisocyanates can include aliphatic isocyanates, cycloaliphatic isocyanates, aromatic isocyanates, blocked aliphatic isocyanates, blocked cycloaliphatic isocyanates, blocked aromatic isocyanates, and combinations thereof.

Non-limiting examples of suitable polyisocyanates include toluene-2,4-diisocyanate; toluene-2,6-diisocyanate; diphenyl methane-4,4'-diisocyanate; diphenyl methane-2,4'-diisocyanate; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethyl hexane-1,6-diisocyanate; 2,4,4-trimethyl hexane-1,6-diisocyanate; lysine methyl ester diisocyanate; bis(isocyanato ethyl) fumarate; isophorone diisocyanate; ethylene diisocyanate; dodecane-1,12-diisocyanate; cyclobutane-1,3-diisocyanate; cyclohexane-1,3-diisocyanate; cyclohexane-1,4-diisocyanate; methyl cyclohexyl diisocyanate; hexahydrotoluene-2,4-diisocyanate; hexahydrotoluene-2,6-diisocyanate; hexahydrophenylene-1,3-diisocyanate; hexahydrophenylene-1,4-diisocyanate; perhydrodiphenylmethane-2,4'-diisocyanate; perhydrodiphenylmethane-4,4'-diisocyanate; and combinations thereof.

The polyisocyanates can also include modified polyisocyanates. The term "modified" means that the polyisocyanates are changed in a known manner to introduce urea groups, carbodiimide groups, urethane groups, isocyanurate groups, thiourea groups, biuret groups, and combinations thereof. Non-limiting examples of modified polyisocyanates include polyureadiisocyanates, polyurethanediisocyanates, polythioureadiisocyanates, and combinations thereof. The modified polyisocyanates can be prepared by reacting any of the previously described polyisocyanates with di-functional materials including, but not limited to, polyols, amines, thiols, and combinations thereof.

Non-limiting examples of polyols that can be reacted with the polyisocyanates to form a modified polyisocyanate include ethylene glycol, propylene glycol, 1,4-butanediol, 1,5-pentanediol, 1,6-hexanediol, 1,2-cyclohexanediol, 1,4-cyclohexanediol, 2,2,4-trimethyl-1,3-pentanediol, 2-butyl-2-ethyl-1,3-propanediol, 3-methyl-1,5-pentanediol, and combinations thereof. Non-limiting examples of amine containing materials that can be reacted with the polyisocyanates to form modified polyisocyanates include ethylene diamine, 1,3-diaminopropane, 1,4-diaminobutane, 1,5-diaminopentane, 1,6 hexamethylene diamine, 1,3-cyclohexanediamine, 1,4-diaminocyclohexane, 1,2-diaminocyclohexane, and combinations thereof. Non-limiting examples of thiol containing materials that can be reacted with the polyisocyanates to form modified polyisocyanates include 1,2-ethanedithiol, 1,3-propanedithiol, 1,4-butanedithiol, 1,5-pentanedithiol, 1,6-hexanedithiol, 2,3-butanedithiol, 2,2'-(ethylenedioxy)diethanethiol, 3,6-dioxa-1,8-octanedithiol, ethyleneglycol bis(3-mercaptopropionate), dimercaptodiethyl sulfide (DMDS), and combinations thereof.

In addition, amino-alcohols, amino-thiols, thiol-alcohols, glycol-thioethers, and combinations thereof can also be reacted with the polyisocyanates to form modified polyisocyanates. Non-limiting examples of amino-alcohols include ethanolamine, 3-amino-1-propanol, 4-amino-1-butanol, 5-amino-1-pentanol, 6-amino-1-hexanol, 3-amino-2-methylpropan-1-ol, 3-amino-2,2-dimethyl-1-propanol, 3-aminobutan-1-ol, 1-amino-2-methylpropan-2-ol, 3-methylamino-1-propanol, 4-methylamino-1-butanol, 5-methyamino-1-pentanol, 6-methylamino-1-hexanol, and combinations thereof. Non-limiting examples of thiol-alcohols include 2-mercaptoethanol, 1-mercapto-2-propanol, 3-mercapto-1-propanol, 2-mercapto-3-butanol, 3-mercapto-3-methylbutan-1-ol; 4-mercapto-1-butanol, and combinations thereof. Further, the amino-thiols can include, but are not limited to, cysteamine and 3-amino-1-propanethiol, and the glycol-thioethers can include, but are not limited to, 2,2'-thiodiethanol. Non-limiting examples of commercially available modified polyisocyanates include the DESMODUR® isocyanates from Bayer and the VESTANAT® isocyanates from Evonik Industries.

The blocked polyisocyanates that can be used as the second component can be prepared by addition of a blocking group, for example β-diketone, phenol, 3,5-dimethylpyrazole, cresol, epsilon-caprolactam, and/or methyl ethyl ketoxime, to a compound containing free isocyanate functional groups such as any of the polyisocyanates previously described. The blocked polyisocyanates can also include those commercially available from Baxenden under the trade name TRIXENE®, such as TRIXENE® BI 7950, TRIXENE® BI 7951, TRIXENE® BI 7960, TRIXENE® BI 7961, TRIXENE® BI 7963, and TRIXENE® BI 7982. Other commercially available blocked polyisocyanates include those commercially available from Bayer under the trade name DESMODUR®, such as DESMODUR® BL 3175A, DESMODUR® BL 3272, DESMODUR® BL 3370, DESMODUR® BL 3475, and DESMODUR® BL 4265 SN.

The at least one photochromic compound that is combined with the first and second components can be selected from inorganic and/or organic photochromic compounds. When two or more photochromic compounds are used in combination, they are generally chosen to complement one another to produce a desired color or hue.

Non-limiting examples of organic photochromic compounds include benzopyrans, naphthopyrans (for example naphtho[1,2-b]pyrans and naphtho[2,1-b]pyrans) spiro-9-fluoreno[1,2-b]pyrans, phenanthropyrans, quinopyrans, and indeno-fused naphthopyrans, such as those disclosed in U.S. Pat. No. 5,645,767 at column 1, line 10 to column 12, line 57 and in U.S. Pat. No. 5,658,501 at column 1, line 64 to column 13, line 36, which disclosures are incorporated herein by reference. Additional non-limiting examples of organic photochromic compounds that may be used include oxazines, such as benzoxazines, naphthoxazines, and spirooxazines. Other non-limiting examples of photochromic compounds that may be used include: fulgides and fulgimides, for example 3-furyl and 3-thienyl fulgides and fulgimides, which are described in U.S. Pat. No. 4,931,220 at column 20, line 5 through column 21, line 38, which disclosure is incorporated herein by reference; diarylethenes, which are described in U.S. Patent Application Publication No. 2003/0174560 from paragraph [0025] to [0086], which disclosure is incorporated herein by reference; and combinations of any of the aforementioned photochromic compounds.

The photochromic compounds described herein can be incorporated into the curable compositions by addition to the composition and/or by dissolving it in a solvent before adding to the curable composition. The photochromic compounds can be added to the present compositions in an amount sufficient to produce a desired change in optical density ($\Delta$OD) when the cured composition is exposed to radiation, such as ultraviolet (UV) radiation.

The curable photochromic compositions can include at least 0.2 weight %, at least 1 weight %, or at least 5 weight % of a photochromic compound. The curable photochromic compositions can also include up to 12 weight %, up to 10 weight %, or up to 8 weight % of a photochromic compound. The curable photochromic compositions can also include a range such as from 0.2 weight % to 12 weight %, or 4 weight % to 8 weight % of a photochromic compound. The weight % of the photochromic compounds in each case is based on the total solids weight of the curable photochromic composition.

The curable photochromic compositions can also include a third component having a second compound with three or more active hydrogen-functional groups and an active hydrogen-functional group equivalent weight of less than or equal to 500, such as less than or equal to 450, or less than or equal to 400, or less than or equal to 350, or less than or equal to 300. The second compound can include various types of polyols, polyamines, polythiols, and combinations thereof and which have an active hydrogen-functional group equivalent weight as previously described. For instance, the second compound can include acrylic polyols, acrylic polyamines, and combinations thereof.

The acrylic polyols and polyamines that can be used as the second compound can be prepared from hydroxyl and amine containing (meth)acrylates. Examples of hydroxyl containing (meth)acrylates include, but are not limited to, hydroxyethyl(meth)acrylate, hydroxypropyl(meth)acrylate, hydroxybutyl(meth)acrylate, hydroxymethylethyl (meth) acrylate, hydroxymethylpropyl (meth)acrylate, and combination thereof. Examples of amine containing (meth)acrylates include, but are not limited to, methacryloyl-L-lysine, N-(3-aminopropyl)methacrylamide, 2-aminoethyl methacrylate, 2-(tert-Butylamino)ethyl (meth)acrylate, N-(2-aminoethyl) methacrylamide, and combinations thereof.

Non-limiting examples of polyols that can be used as the second compound include pentaerythritol, 2-hydroxymethyl-1,3-propanediol, dipentaerythritol, 1,1,1-tris(hydroxymethyl)ethane, 1,1,1-tris(hydroxymethyl)propane, 2,2,6,6-tetrakis(hydroxymethyl)cyclohexanol, and combinations thereof. Non-limiting examples of polyamines that can be used as the second compound of the third component include bis(3-aminopropyl)amine, triethylenetetramine, 1,2-bis(3-aminopropylamino)ethane, tetraethylenepentamine, tris[2-(methylamino)ethyl]amine, and combinations thereof.

As indicated, polythiols can also be used as the second compound of the third component. Non-limiting examples of suitable polythiols include pentaerythritol tetrakis(3-mercaptopropionate), pentaerythritol tetrakis(2-mercaptoacetate), thioglycerol-bis(2-mercaptoacetate), trimethylolpropane tris(3-mercaptopropionate), trimethylolpropane tris(2-mercaptoacetate), and combinations thereof. Examples of polythiols are also disclosed in U.S. Patent Application Publication No. 2009/0176945, which is incorporated by reference herein in its entirety.

Further, materials having both hydroxyl and thiol groups can be used as the second compound. Non-limiting examples of such materials include glycerin bis(2-mercaptoacetate), glycerin bis(3-mercaptopropionate), 1,3-dimercapto-2-propanol, 2,3-dimercapto-1-propanol, trimethylolpropane bis(2-mercaptoacetate), trimethylolpropane bis(3-mercaptopropionate), pentaerythritol bis(2-mercaptoacetate), pentaerythritol tris(2-mercaptoacetate), pentaerythritol bis(3-mercaptopropionate), pentaerythritol tris(3-mercaptopropionate), and combinations thereof.

The curable photochromic compositions of the present invention can contain additional components that impart desired properties or characteristics to the composition, or which are used to apply and cure the photochromic compositions as coatings on the surface of a substrate. Such components include, but are not limited to, ultraviolet light absorbers, light stabilizers, such as hindered amine light stabilizers (HALS), asymmetric diaryloxalamide (oxanilide) compounds, singlet oxygen quenchers, antioxidants, heat stabilizers, rheology control agents, leveling agents, free radical scavengers, tinting agents, adhesion promoting agents, such as trialkoxysilanes, and mixtures thereof. Catalysts may also be incorporated into the composition as necessary to effect the chemical reactions for cure.

The first component, second component, at least one photochromic compound, and, optionally, the additional components described herein, such as the third component, can be combined in one step to form a curable photochromic composition. Alternatively, a portion of the first component and a portion of the second component can be reacted separately with either the second component or first component in excess to form an isocyanate functional prepolymer or an active-hydrogen-functional prepolymer. The prepolymer can then be combined with a remainder of the first component and/or the second component, at least one photochromic compound, and, optionally, the additional components described herein, such as the third component, to form a curable photochromic composition. For example, a diol can be reacted with an excess of a polyisocyanate or blocked polyisocyanate, such as a molar ratio of greater than 1:1 of the isocyanate:diol, to form a urethane prepolymer that is isocyanate functional. The isocyanate functional prepolymer can then be combined with additional diol, at least one photochromic compound, and, optionally, the additional components described herein, such as the third component, to form a curable photochromic composition.

Further, the first and second components can be combined to form a curable photochromic composition with a ratio of total isocyanate and blocked isocyanate equivalents of the second component to total active hydrogen-functional group equivalents of the first component of at least 4:1, at least 5:1, at least 6:1, at least 7:1, at least 8:1, at least 9:1, at least 10:1, or at least 15:1. The first and second components can also be combined to form a curable photochromic composition with a ratio of total isocyanate and blocked isocyanate equivalents of the second component to total active hydrogen-functional group equivalents of the first component of up to 100:1, up to 50:1, up to 30:1, up to 25:1, or up to 20:1. The first and second components can further be combined to form a curable photochromic composition with a ratio range of total isocyanate and blocked isocyanate equivalents of the second component to total active hydrogen-functional group equivalents of the first component such as from 4:1 to 100:1, or from 5:1 to 30:1, or from 6:1 to 20:1.

As used herein, the recitation of "total active hydrogen-functional equivalents of the first component" means the total equivalents of active hydrogen-functional groups of the first component. As used herein, the recitation of "total active hydrogen-functional equivalents of the third component" means the total equivalents of active hydrogen-functional groups of the third component. The active hydrogen-functional groups can include, but are not limited to, hydroxyls, primary amines, secondary amines, thiols, and combinations thereof, as described previously herein. Further, as used herein, the recitation of "total isocyanate and blocked isocyanate equivalents of the second component" means the total sum of isocyanate equivalents and blocked isocyanate equivalents of the second component.

In addition, the first, second, and third components can be combined to form a curable photochromic composition with a ratio of total isocyanate and blocked isocyanate equivalents of the second component to total active hydrogen-functional group equivalents of the first component and the third component of at least 4:1, at least 5:1, at least 6:1, at least 7:1, at least 8:1, at least 9:1, at least 10:1, or at least 15:1. The first, second, and third components can also be combined to form a curable photochromic composition with ratio of total isocyanate and blocked isocyanate equivalents of the second component to total active hydrogen-functional group equivalents of the first component and the third component of up to 40:1, up to 30:1, up to 25:1, or up to 20:1. The first, second, and third components can further be combined to form a curable photochromic composition with a ratio range of total isocyanate and blocked isocyanate equivalents of the second component to total active hydrogen-functional group equivalents of the first component and the third component such as from 4:1 to 40:1, or from 5:1 to 30:1, or from 6:1 to 20:1.

After forming the curable photochromic compositions, the compositions can be applied to a surface of a substrate and cured to form a coating layer over at least a portion of the substrate, thereby forming a photochromic article. Non-limiting examples of suitable substrates include paper, glass, ceramics, wood, masonry, textiles, metals, and polymeric organic host materials. The photochromic coatings are particularly useful when applied to optical substrates, such as optical substrates made from glass, minerals, ceramics, and metal.

Polymeric substrates that may be used in preparing the photochromic articles of the present invention include organic polymeric materials and inorganic materials, such as glass. As used herein, the term "glass" is defined as being a polymeric substance, for example a polymeric silicate. The glass substrate can be a clear, low colored, transparent glass such as the well-known silica type glass, particularly soda-lime-silica glass. The nature and composition of various silica glasses are well known in the art. The glass may be strengthened by either thermal or chemical tempering.

Non-limiting examples of polymeric organic substrates include plastic materials that are chemically compatible with the photochromic coating applied to the surface of the substrate. The polymeric organic substrate may be prepared from art-recognized polymers that are useful as optical substrates, such as organic optical resins that are used to prepare optically clear castings for optical applications, such as ophthalmic lenses.

The photochromic compositions of the present invention can be applied to the surface of a substrate by any means standard in the art, such as spin coating, printing, spraying, electrostatic spraying, dipping, rolling, brushing, curtain coating, and the like.

The photochromic compositions of the present invention can also be used alone or in combination with additional layers. For example, the coating compositions can be applied over a primer coating. A "primer coating" refers to coating compositions from which an undercoating may be deposited onto a substrate in order to prepare the surface for application of a protective or decorative coating system.

It was found that the coatings described herein comprise a plurality of soft segment domains formed from the first component and a plurality of hard segment domains formed from the second component. When the compositions include the third component previously described, the third component can also form a portion of the hard segment domains of the cured coating. As such, the curable photochromic compositions can be applied to a substrate and cured to form phase-separated coatings. Without being bound by theory, it is believed that the photochromic compounds at least partially reside in the plurality of soft segment domains of the cured coatings.

The plurality of soft segment domains can have a size of less than 300 nanometers (nm), less than 250 nm, less than 200 nm, less than 150 nm, or less than 100 nm. The domain sizes are determined by atomic force microscopy (AFM), small angle x-ray scattering (SAXS), or transmission electron microscopy (TEM), for example. The plurality of soft segment domains can also have a glass transition temperature (Tg) of equal to or less than $-10°$ C., or equal to or less than $-50°$ C., or equal to or less than $-100°$ C. The plurality of soft segment domains can have a Tg as low as $-150°$ C. The plurality of soft segment domains can also have a Tg range such as from $-10°$ C. to $-150°$ C.

The plurality of hard segment domains can have a Tg of at least $0°$ C., at least $50°$ C., at least $100°$ C., or at least $125°$ C. The plurality of hard segment domains can have a Tg of up to $150°$ C. The plurality of hard segment domains can also have a Tg range such as from $0°$ C. to $150°$ C. The Tg can be determined by dynamic mechanical analysis (DMA) or differential scanning calorimetry (DSC), for example.

Further, the coatings formed from the photochromic compositions can exhibit a Fischer microhardness of at least 10 $N/mm^2$, at least 25 $N/mm^2$, at least 50 $N/mm^2$, or at least 100 $N/mm^2$. The coatings can also exhibit a Fischer microhardness of up to 125 $N/mm^2$ or up to 150 $N/mm^2$. The Fischer microhardness is measured by a Fischerscope H100SMC stylus microhardness instrument following the instruction described in the Fischerscope H100SMC Manual ("Fischer microhardness test").

As indicated, the present invention is also directed to a photochromic article that comprises a substrate, such as an optical substrate, and at least one photochromic coating layer as described herein residing over at least a portion the substrate. The photochromic articles of the present invention can be used in a variety of applications. For example, the photochromic articles may be designed for use on transparent, e.g., optical, plastic, or glass substrates intended for ophthalmic applications, such as vision correcting lenses, sun lenses and goggles, commercial and residential windows, automotive and aircraft transparencies, helmets, clear films, and the like.

Further, the photochromic articles of the present invention can be used in association with plastic or glass films and sheets, optical devices, e.g., optical switches, display devices and memory storage devices, such as those described in U.S. Pat. No. 6,589,452, and security elements, such as optically-readable data media, e.g., those described in U.S. Patent Application Publication No. 2002/0142248, security elements in the form of threads or strips, as described in U.S. Pat. No. 6,474,695, and security elements in the form of verification marks that can be placed on security documents and articles of manufacture.

The following examples are presented to demonstrate the general principles of the invention. The invention should not be considered as limited to the specific examples presented. All parts and percentages in the examples are by weight unless otherwise indicated.

EXAMPLE 1

Preparation of a Polyester Polycarbonate Diol

A polyester polycarbonate diol was prepared from the components listed in Table 1.

TABLE 1

| Component | Weight (grams) |
| --- | --- |
| ETERNACOLL ® UH-50 [1] | 250.1 |
| Adipic acid | 67.16 |
| Triphenyl phosphite | 0.3 |
| Dibutyltinoxide | 0.3 |

[1] Polycarbonate diol available from UBE Industries.

The components listed in Table 1 were added to a 500 ml 4-Neck round bottom flask equipped with a mechanical stirrer and Dean-Stark trap. The mixture was heated to 140° C. under nitrogen, and stirred for one hour. The reaction was raised to 180° C. and stirred for an additional hour. Temperature was then raised to 200° C. and stirred for 11 hours. The reaction was cooled to 120° C. under nitrogen and then to room temperature to yield a polyester polycarbonate diol with a number average molecular weight (Mn) of 7,850 and a polydispersity of 2.02. The acid value was less than 0.19 mg KOH/g (based on solids), and the hydroxyl equivalent weight was 2,318 based on solids.

EXAMPLE 2

Preparation of a Polycarbonate Diol

A polycarbonate diol was prepared according to the Polycarbonate Polyol B (PP-B) preparation in Part 1 of the Examples section of U.S. Pat. No. 8,608,988 at column 19, lines 47-59, which is incorporated by reference herein. The hydroxyl equivalent weight of the polycarbonate diol was 1810 (based on solids). The final resin was reduced to 60% solids with dipropylene glycol methyl ether acetate (DPMA).

EXAMPLE 3

Preparation of an Active Hydrogen-Functional Prepolymer

An active hydrogen-functional prepolymer was prepared from the components listed in Table 2.

TABLE 2

| Component | Weight (grams) |
| --- | --- |
| DURANOL ® T5652A [2] | 181.9 |
| N-methyl-2-pyrrolidone | 131.9 |
| VESTANAT ® TMDI [3] | 15.6 |
| K-KAT ® 348 [4] | 0.34 |

[2] Polycarbonate diol available from Asahi Kasei Chemicals Corporation.
[3] Isocyanate available from Evonik Industries.
[4] Bismuth catalyst available from King Industries Inc.

In accordance with Table 1, DURANOL® T5652A was mixed under nitrogen with N-methyl-2-pyrrolidone and VESTANAT® TMDI for 15 minutes followed by addition of K-KAT® 348. The reaction mixture was stirred at room temperature for one hour and then heated to 80° C. for three hours until all free isocyanates were consumed, as determined by FTIR spectroscopy. The reaction mixture was cooled to room temperature and the resulting clear, viscous polymer solution was collected. The final product had a number average molecular weight (Mn) of 16,600, a weight average molecular weight (Mw) of 32,200, and 59.7% total solids. The theoretical active hydrogen equivalent weight of the material was 5,011 based on solids.

EXAMPLE 4

Preparation of an Isocyanate Functional Prepolymer

An active isocyanate functional prepolymer was prepared from the components listed in Table 3.

TABLE 3

| Component | Weight (grams) |
| --- | --- |
| Polycarbonate diol of Example 2 | 30 |
| VESTANAT ® TMDI [3] | 14.6 |
| Dibutyltin dilaurate | 0.05 |
| Di(propylene glycol) methyl ether acetate | 4 |
| 3,5-Dimethylpyrazole | 10.9 |

In accordance with Table 3, the polycarbonate diol of Example B was added dropwise into a 40° C. solution of VESTANAT® TMDI and dibutyltin dilaurate, followed by a rinse with di(propylene glycol) methyl ether acetate. The solution was heated to 60° C. for 1.5 hours. 3,5-dimethylpyrazole was then added in portions until isocyanate was not observed by FTIR spectroscopy. The reaction mixture was cooled to provide a viscous oil with a solids content of 73% (one hour, 120° C.). The number average molecular weight (Mn) of the polymer portion was 7,390 and the weight average molecular weight (Mw) was 9,850. The isocyanate equivalent weight of the sample was 400 based on solids.

EXAMPLE 5

Preparation of a Polyureapolyurethane Diisocyanate

A polyureapolyurethane diisocyanate was prepared from the components listed in Table 4.

TABLE 4

| Component | Weight (grams) |
|---|---|
| Hexafluoropentanediol | 3 |
| Hexamethylenediamine | 1.6 |
| VESTANAT® TMDI [3] | 11.9 |
| Dibutyltin dilaurate | 0.05 |
| N-methyl-2-pyrrolidone | 11.5 |
| 3,5-Dimethylpyrazole | 5.35 |

In accordance with Table 4, a solution of hexafluoropentanediol, hexamethylenediamine, and 3,5-dimethylpyrazole in N-methyl-2-pyrrolidone was added dropwise to a solution of VESTANAT® TMDI and dibutyltin dilaurate at 40° C. After rinsing with N-methyl-2-pyrrolidone, the reaction mixture was stirred at 65° C. for two hours. Additional 3,5-dimethylpyrazole was then added in portions until isocyanate was not observed by FTIR spectroscopy. The reaction mixture was cooled to provide a viscous oil with a solids content of 68%. The isocyanate equivalent weight of the sample was 410 based on solids.

EXAMPLES 6-16

Preparation of Curable Photochromic Compositions

Curable photochromic compositions were prepared from the components listed in Tables 5 and 6. All components are listed in parts per weight and quantities in Charge 2 are listed by solid component only.

TABLE 5

| | Comparative Ex. 6 | Comparative Ex. 7 | Ex. 8 | Ex. 9 | Ex. 10 | Ex. 11 |
|---|---|---|---|---|---|---|
| Charge 1 | | | | | | |
| Photochromic dyes [5] | 4.00 | 3.99 | 4.11 | 3.99 | 4.01 | 3.96 |
| TINUVIN® 144 [6] | 2.00 | 2.00 | | 2.00 | 2.02 | 1.82 |
| Stabilizer [7] | | | 1.97 | | | |
| IRGANOX® 245 [8] | 2.00 | 2.00 | 1.95 | 2.00 | 2.02 | 1.82 |
| N-methyl-2-pyrrolidone | 55.33 | 34.08 | 67.93 | 37.17 | 32.72 | 35.65 |
| Charge 2 | | | | | | |
| ETERNACOLL® PH200D [9] | 33.18 | | | | | |
| Compound of Example 1 | | | 35.83 | | | |
| Compound of Example 2 | | 33.18 | | 33.16 | | 31.36 |
| Compound of Example 3 | | | | | | |
| Poly(ethylene glycol-ran-propylene glycol) [10] | | | | | | |
| K-KAT® 348 [4] | 0.74 | 0.77 | 1.10 | 0.72 | 0.79 | 0.90 |
| SILQUEST® A-187 [11] | 3.98 | 3.85 | 6.20 | 3.88 | 4.05 | 5.31 |
| Acrylic polyol [12] | 22.69 | 17.84 | | 3.48 | 5.05 | |
| TRIXENE® BI-7960 [13] | 44.13 | 48.97 | 64.17 | 63.36 | 29.32 | 49.87 |
| Compound of Example 4 | | | | | 65.63 | |
| Compound of Example 5 | | | | | | 18.76 |
| BYK® 333 [14] | 0.07 | 0.07 | 0.09 | 0.07 | 0.09 | 0.11 |
| Solvent from resins [15] | 34.02 | 55.20 | 28.70 | 52.28 | 40.26 | 51.42 |
| % Solids (theory) | 55.8 | 55.8 | 54.4 | 55.7 | 60.8 | 56.7 |

TABLE 6

| | Ex. 12 | Ex. 13 | Ex. 14 | Ex. 15 | Ex. 16 |
|---|---|---|---|---|---|
| Charge 1 | | | | | |
| Photochromic dyes [5] | 4.01 | 4.01 | 4.01 | 4.04 | 3.99 |
| TINUVIN® 144 [6] | 2.01 | 2.01 | 2.01 | 2.01 | 1.99 |
| Stabilizer [7] | | | | | |
| IRGANOX® 245 [8] | 2.00 | 2.00 | 2.00 | 2.01 | 1.99 |
| N-methyl-2-pyrrolidone | 33.87 | 33.87 | 33.87 | 24.84 | 25.81 |
| Charge 2 | | | | | |
| ETERNACOLL® PH200D [9] | | | | | |
| Compound of Example 1 | | | | | |
| Compound of Example 2 | 28.39 | 31.30 | 34.16 | | |
| Compound of Example 3 | | | | 31.82 | |
| Poly(ethylene glycol-ran-propylene glycol) [10] | | | | | 31.48 |
| K-KAT® 348 [4] | 0.91 | 0.91 | 0.91 | 0.87 | 0.79 |
| SILQUEST® A-187 [11] | 4.53 | 4.53 | 4.53 | 4.19 | 3.92 |
| Acrylic polyol [12] | 9.16 | 6.26 | 3.41 | 4.25 | 3.38 |
| TRIXENE® BI-7960 [13] | 62.45 | 62.44 | 62.43 | 63.93 | 65.13 |
| Compound of Example 4 | | | | | |
| Compound of Example 5 | | | | | |
| BYK® 333 [14] | 0.11 | 0.11 | 0.11 | 0.11 | 0.14 |
| Solvent from Resins [15] | 51.74 | 51.86 | 51.97 | 70.24 | 35.07 |
| % Solids (theory) | 57.0 | 57.0 | 57.0 | 54.4 | 65.0 |

[5] Blend of photochromic indenofused naphthopyran dyes designed to give a green-gray color.
[6] Hindered amine light stabilizer, commercially available from BASF.
[7] Stabilizer corresponding to Compound 23 in U.S. Pat. No. 4,198,334.
[8] Antioxidant commercially available from BASF.
[9] Polycarbonate diol with an average equivalent weight of 983, commercially available from Ube Chemicals.
[10] Available from Sigma-Aldrich Inc. with a Mn of 12,000, and a hydroxyl equivalent weight of 6,000.
[11] Gamma-glycidoxypropyl trimethoxysilane, available from OSi Specialties.
[12] Made from free radical polymerization of Hydroxypropyl methacrylate (40.4%), Butyl methacrylate (57.6%) and Acrylic acid (2.0%) with a number average molecular weight (Mn) of 5500 as determined by GPC with polystyrene standard and tetrahydrofuran diluent. Hydroxyl Equivalent weight (on solids) of 360. Material reduced to 61% solids using dipropylene glycol methyl ether acetate).
[13] Blocked hexamethylene diisocyanate available from Baxenden Chemical Co.
[14] A polyether modified dimethylpolysiloxane copolymer available from BYK-Chemie.
[15] Total solvent from raw materials.

For each coating composition shown in Tables 5 and 6, the components of Charge 1 were added to a suitable vessel with stirring and heated to 40-60° C. for a minimum of 30 minutes until the solids dissolved. The ingredients of Charge 2 were combined, mixed thoroughly, and then added to the solution of Charge 1. The resulting mixture was placed on a WHEATON® 348923-A Benchtop Roller, available from Wheaton Industries, Inc., for a minimum of six hours prior to use. The centi-equivalents (cEq) and resulting NCO to active hydrogen ratios for each Example are shown in Table 7.

TABLE 7

| Example | cEq 1$^{st}$ Component | cEq 2$^{nd}$ Component | cEq 3$^{rd}$ Component | NCO:Active Hydrogens |
|---|---|---|---|---|
| 6 | 3.38 | 15.38 | 6.30 | 1.6:1.0[16] |
| 7 | 1.77 | 17.06 | 4.96 | 2.5:1.0 |
| 8 | 1.55 | 22.36 | — | 14.4:1.0 |
| 9 | 1.77 | 22.08 | 0.97 | 8.1:1.0 |
| 10 | 1.47 | 31.43 | 1.40 | 10.9:1.0 |
| 11 | 1.73 | 21.92 | — | 12.6:1.0 |
| 12 | 1.57 | 21.76 | 2.54 | 5.3:1.0 |
| 13 | 1.73 | 21.76 | 1.74 | 6.3:1.0 |
| 14 | 1.89 | 21.75 | 0.95 | 7.7:1.0 |
| 15 | 3.03 | 24.67 | 1.18 | 5.9:1.0 |
| 16 | 0.52 | 22.70 | 0.94 | 15.5:1.0 |

[16]The first component of Comparative Example 6 comprises a polyol having an equivalent weight of 983.

EXAMPLE 17

Application of Photochromic Coatings

The compositions of Examples 6-9 and 11-16 were each applied to a PDQ® coated Gentex® polycarbonate plano lens having a diameter of 76 millimeters. The composition of Example 10 was applied to 2"×2" (5.08 cm×5.08 cm) CR-39 chips from Homalite of Wilmington, Delaware. All substrates were treated with oxygen plasma at a flow rate of 100 milliliters (mL) per minute of oxygen at 100 watts of power for three minutes prior to being coated with the compositions of Examples 6-16 via a spin coating process. About 1-2 mL of each composition was dispensed onto the substrate and then rotated for eight seconds at a spin speed sufficient to deposit 0.25-0.35 g of wet coating onto the lens or about 0.15-0.19 g of wet coating onto the CR39 chip. The spin coating parameters are shown in Table 8 below.

TABLE 8

| Example | Substrate | Spin Time (sec) | Spin speed (rpm) | Photochromic coating weight (g) |
|---|---|---|---|---|
| 6 | Polycarbonate Lens | 8 | 916 | 0.27 |
| 7 | Polycarbonate Lens | 8 | 976 | 0.26 |
| 8 | Polycarbonate Lens | 8 | 916 | 0.27 |
| 9 | Polycarbonate Lens | 8 | 916 | 0.26 |
| 10 | CR39 Chip | 8 | 1308 | 0.16 |
| 11 | Polycarbonate Lens | 8 | 1112 | 0.25 |
| 12 | Polycarbonate Lens | 8 | 916 | 0.30 |
| 13 | Polycarbonate Lens | 8 | 916 | 0.31 |
| 14 | Polycarbonate Lens | 8 | 916 | 0.31 |
| 15 | Polycarbonate Lens | 12 | 1157 | 0.35 |
| 16 | Polycarbonate Lens | 8 | 1399 | 0.30 |

The coated substrates were made in duplicate and designated as Set "A" and Set "B". The coated substrates were then placed in a 40° C. oven until all lenses or chips were accumulated. The chips or lenses were then cured in a forced air oven at 125° C. for one hour and subsequently cooled to room temperature. The lenses and chip of Set "A" were then subjected to an additional thermal cure for three hours at 105° C. and set aside for evaluation. The lenses and chip of Set "B" were further treated with oxygen plasma as previously described and coated with a protective coating according to the formulation reported in Table 1 of Example 1 in U.S. Pat. No. 7,410,691, which is incorporated herein by reference, using an additional 0.5% polybutyl acrylate. The protective coating was applied by spin coating and UV cured in an EyeUV oven equipped with D bulbs. Following this, each lens or chip was further cured at 105° C. for three hours. The lenses and chip of Set "B" were then evaluated for photochromic properties.

EXAMPLE 18

Microhardness and Photochromic Performance Evaluation

The coated substrates of Set "A" of Example 17 were subjected to microhardness testing using a Fischerscope HCV, Model H100SMC available from Fischer Technology, Inc. Each lens was measured from 2 to 5 times and the resulting data was averaged. The hardness measurements were taken as the hardness at a penetration depth of 2 microns after a 100 Newton load for 15 seconds.

In addition, the photochromic performance of the coated substrates of Set "B" of Example 17 were tested on the Bench for Measuring Photochromics ("BMP") made by Essilor, Ltd. France. The optical bench was maintained at a constant temperature of 73.4° F. (23° C.) during testing. Prior to testing on the optical bench, each of the coated lenses were exposed to 365-nanometer ultraviolet light for about 10 minutes at a distance of about 14 centimeters to activate the photochromic materials. The UVA (315 to 380 nm) irradiance at the lens was measured with a LICOR® Model Li-1800 spectroradiometer and found to be 22.2 watts per square meter. Each lens was then placed under a 500 watt, high intensity halogen lamp for about 10 minutes at a distance of about 36 centimeters to bleach (inactivate) the photochromic materials. The illuminance at the lens was measured with the LICOR® spectroradiometer and found to be 21.9 Klux. Each lens was then kept in a dark environment at room temperature (from 70 to 75° F., or 21 to 24° C.) for at least one hour prior to testing on an optical bench. Prior to measurement, each lens was measured for ultraviolet absorbance at 390 nanometers.

The BMP optical bench was fitted with two 150-watt Newport Model #6255 Xenon arc lamps set at right angles to each other. The light path from Lamp 1 was directed through a 3 mm SCHOTT® KG-2 band-pass filter and appropriate neutral density filters that contributed to the required UV and partial visible light irradiance level. The light path from Lamp 2 was directed through a 3 mm SCHOTT® KG-2 band-pass filter, a SCHOTT® short band 400 nm cutoff filter and appropriate neutral density filters in order to provide supplemental visible light illuminance. A 2 inch×2 inch (5.08 cm×5.08 cm) 50% polka dot beam splitter set at 45° to each lamp is used to mix the two beams. The combination of neutral density filters and voltage control of the Xenon arc lamp were used to adjust the intensity of the irradiance. Software i.e., BMPSoft version 2.1e was used on the BMP to control timing, irradiance, air cell and sample temperature, shuttering, filter selection, and response measurement. A ZEISS® spectrophotometer, Model MCS 601, with fiber optic cables for light delivery through the lens was used for response and color measurement. Photopic response measurements were collected on each lens.

The power output of the optical bench, i.e., the dosage of light that the lens was exposed to, was adjusted to 6.7 watts per square meter ($W/m^2$) UVA, integrated from 315-380 nm, and 50 Klux illuminance, integrated from 380-780 nm. Measurement of this power setpoint was made using an irradiance probe and the calibrated Zeiss spectrophotometer. The lens sample cell was fitted with a quartz window and self-centering sample holder. The temperature in the sample cell was controlled at 23° C. through the software with a modified Facis, Model FX-10, environment simulator. Measurement of the sample's dynamic photochromic response and color measurements were made using the same Zeiss spectrophotometer with fiber optic cables for light delivery from a tungsten halogen lamp through the sample. The collimated monitoring light beam from the fiber optic cable was maintained perpendicular to the test sample while passing through the sample and directed into a receiving fiber optic cable assembly attached to the spectrophotometer. The exact point of placement of the sample in the sample cell was where the activating xenon arc beam and the monitoring light beam intersected to form two concentric circles of light. The angle of incidence of the xenon arc beam at the sample placement point was ≈30° from perpendicular.

Response measurements, in terms of a change in optical density (*OD) from the unactivated or bleached state to the activated or colored state were determined by establishing the initial unactivated transmittance, opening the shutter from the Xenon lamp(s) and measuring the transmittance through activation at selected intervals of time. Change in optical density was determined according to the formula: $*OD=\log_{10}(\% T_b/\% T_a)$, where $\% T_b$ is the percent transmittance in the bleached state and $\% T_a$ is the percent transmittance in the activated state. Optical density measurements were based on photopic optical density.

The results of the microhardness and photochromic performance are shown in Table 9. The ΔOD at saturation is after 15 minutes of activation and the Fade Half Life ("T½") value is the time interval in seconds for the ΔOD of the activated form of the photochromic material in the coating to reach one half the fifteen-minute ΔOD at 73.4° F. (23° C.), after removal of the activating light source.

TABLE 9

| Example | NCO:OH (OH = 1.0) | Fischer microhardness ($N/mm^2$) | T½ @ Photopic (seconds) |
|---|---|---|---|
| 6 | 1.6 | 28 | 131 |
| 7 | 2.5 | 35 | 109 |

TABLE 9-continued

| Example | NCO:OH (OH = 1.0) | Fischer microhardness ($N/mm^2$) | T½ @ Photopic (seconds) |
|---|---|---|---|
| 8 | 14.4 | 11 | 97 |
| 9 | 8.1 | 28 | 101 |
| 10 | 18.9 | 17 | 93 |
| 11 | 12.6 | 19 | 103 |
| 12 | 5.3 | 43 | 104 |
| 13 | 6.3 | 28 | 100 |
| 14 | 7.7 | 18 | 99 |
| 15 | 9.2 | 30 | 101 |
| 16 | 15.5 | 24 | 77 |

As shown in Table 9, the photochromic coatings of Examples 8-16, which had a NCO:OH ratio of at least 4:1, exhibited superior photochromic performance with good hardness as compared to Comparative Examples 6 and 7, which had a NCO:OH ratio of less than 4:1.

EXAMPLE 19

Dynamic Mechanical Analysis

Examples 6, 7, 9, and 16 were evaluated for dynamic mechanical analysis (DMA) using TA Instruments 2980 DMA unit in tension film mode. Amplitude was set at 20 µm, preload force of 0.01N, force track of 150% and frequency of 1 Hz. The temperature cycle chosen was −100 to 175° C. with a heating rate of 3° C./minute. Clamping force of 20 cNm was also used. Sample dimensions were 15 mm×6.4 mm with a thickness of 20-30 µm. The DMA results are shown in Table 10.

TABLE 10

| Example | Peak 1 Tan Delta (Tg, ° C.) | Peak 1 Description | Peak 2 Tan Delta (Tg, ° C.) | Peak 2 Description | Phase Separation | Fade T½ (sec.) |
|---|---|---|---|---|---|---|
| 6 | 55 | Major Peak | −14 | Very Minor Shoulder | Very Slight | 131 |
| 7 | 71 | Major Peak | −20 | Minor Shoulder | Slight | 109 |
| 9 | 70 | Major Peak | −19 | Separate Peak | Moderate | 101 |
| 16 | 93 | Major Peak | −68 | Major Peak | Substantial | 77 |

Dynamic mechanical analysis (DMA) can relate to the miscibility of the polymer blend. Two separate Tg peaks means a heterogeneous system in which the two polymers exist as separate phases. One single peak indicates that the polymer blend is completely miscible. There is a continuum between these two states. As shown in Table 10, Comparative Examples 6 and 7 show a shoulder as the low Tg material. Example 9 shows a much more pronounced peak at a low Tg indicating increased separation between the hard and soft polymer domains. Example 16 shows an even greater degree of phase separation as evidenced by the increased separation of its two peaks.

The present invention is also directed to the following clauses.

Clause 1: A curable photochromic composition comprising: (a) a first component comprising a first compound having at least two active hydrogen-functional groups and an active hydrogen-functional group equivalent weight of at least 1000; (b) a second component comprising at least one of a polyisocyanate and a blocked polyisocyanate; and (c) at least one photochromic compound, wherein the ratio of total isocyanate and blocked isocyanate equivalents of the second component to total active hydrogen-functional group equivalents of the first component is at least 4:1.

Clause 2: The curable photochromic composition of clause 1, further comprising: (d) a third component comprising a second compound having three or more active hydrogen-functional groups and an active hydrogen-functional group equivalent weight of less than or equal to 500, wherein the ratio of total isocyanate and blocked isocyanate equivalents of the second component to total active hydrogen-functional group equivalents of the first and third components is at least 4:1.

Clause 3: The curable photochromic composition of clause 1, wherein the ratio of total isocyanate and blocked isocyanate equivalents of the second component to total active hydrogen-functional group equivalents of the first component is at least 5:1.

Clause 4: The curable photochromic composition of clause 1, wherein the ratio of total isocyanate and blocked isocyanate equivalents of the second component to total active hydrogen-functional group equivalents of the first component is up to 50:1.

Clause 5: The curable photochromic composition of any of clauses 1-4, wherein the second component (b) comprises a polyureadiisocyanate, a blocked polyureadiisocyanate, a polyurethanediisocyanate, a blocked polyurethanediisocyanate, a polythiourethanediisocyanate, a blocked polythiourethanediisocyanate, or combinations thereof.

Clause 6: The curable photochromic composition of any of clauses 1-5, wherein the curable photochromic composition comprises a prepolymer comprising a reaction product of (a) and (b).

Clause 7: The curable photochromic composition of any of clauses 1-6, wherein the first compound and second compound each independently comprise active hydrogen-functional groups chosen from hydroxyls, primary amines, secondary amines, thiols, or combinations thereof.

Clause 8: The curable photochromic composition of any of clauses 1-7, wherein the first compound and/or the second compound each independently comprise a polyol.

Clause 9: The curable photochromic composition of any of clauses 1-8, wherein the polyol of the first compound is independently selected from polyether polyols, polyester polyols, polycarbonate polyols, or combinations thereof.

Clause 10: The curable photochromic composition of any of clauses 2-9, wherein the polyol of the second compound comprises an acrylic polyol.

Clause 11: The curable photochromic composition of any of clauses 1-10, wherein the at least one photochromic compound is an organic photochromic material selected from photochromic spirooxazines, benzopyrans, naphthopyrans, indenonaphthopyrans, fulgides, metal dithizonates, diarylethenes, or combinations thereof.

Clause 12: The curable photochromic composition of any of clauses 1-11, wherein when applied to a substrate and cured to form a coating, the first component forms a plurality of soft segment domains and the second component forms a plurality of hard segment domains.

Clause 13: The curable photochromic composition of any of clauses 2-12, wherein when applied to a substrate and cured to form a coating, the first component forms a plurality of soft segment domains and the second and third components together form a plurality of hard segment domains.

Clause 14: The curable photochromic composition of any of clauses 12-13, wherein the plurality of soft segment domains have a Tg of −10° C. to −150° C., and the plurality of hard segment domains have a Tg of 0° C. to 150° C.

Clause 15: The curable photochromic composition of claim of any of clauses 12-14, wherein the plurality of soft segment domains each comprise a size of less than 300 nm.

Clause 16: The curable photochromic composition of any of clauses 12-14, wherein the plurality of soft segment domains each comprise a size of less than 100 nm.

Clause 17: The curable photochromic composition of claim of any of clauses 12-16, wherein the at least one photochromic compound at least partially resides in the plurality of soft segment domains formed from the first component.

Clause 18: The curable photochromic composition of any of clauses 1-17, wherein when applied to a substrate and cured to form a coating, the coating exhibits a Fischer microhardness of at least 10 N/mm$^2$.

Clause 19: A photochromic article comprising: (a) a substrate; and (b) at least one coating layer formed from the composition of any of clauses 1-18 residing over at least a portion of the substrate.

Clause 20: The photochromic article of clause 19, wherein the substrate is an optical substrate.

Clause 21: The photochromic article of any of clauses 19-20, wherein the ratio of total isocyanate and blocked isocyanate equivalents of the second component to total active hydrogen-functional group equivalents of the first component is at least 5:1.

Whereas particular embodiments of this invention have been described above for purposes of illustration, it will be evident to those skilled in the art that numerous variations of the details of the present invention may be made without departing from the invention as defined in the appended claims.

The invention claimed is:

1. A curable photochromic composition comprising:
  (a) a first component comprising a first compound having at least two active hydrogen-functional groups and an active hydrogen-functional group equivalent weight of at least 1000, wherein said first compound comprises a polyol, and said polyol of said first compound is selected from polyether polyols, polyester polyols, polycarbonate polyols, and combinations thereof;
  (b) a second component comprising at least one of a polyisocyanate and a blocked polyisocyanate; and
  (c) at least one photochromic compound,
  wherein the ratio of total isocyanate and blocked isocyanate group equivalents of the second component to total active hydrogen-functional group equivalents is at least 4:1.

2. The curable photochromic composition of claim 1, further comprising:
  (d) a third component comprising a second compound having three or more active hydrogen-functional groups and an active hydrogen-functional group equivalent weight of less than or equal to 500.

3. The curable photochromic composition of claim 1, wherein the ratio of total isocyanate and blocked isocyanate group equivalents of the second component to total active hydrogen-functional group equivalents is at least 5:1.

4. The curable photochromic composition of claim 1, wherein the ratio of total isocyanate and blocked isocyanate group equivalents of the second component to total active hydrogen-functional group equivalents is up to 50:1.

5. The curable photochromic composition of claim 1, wherein the polyisocyanate of the second component (b) is selected from a polyureadiisocyanate, a blocked polyureadiisocyanate, a polyurethanediisocyanate, a blocked polyurethanediisocyanate, a polythiourethanediisocyanate, a blocked polythiourethanediisocyanate, and combinations thereof.

6. The curable photochromic composition of claim 1, wherein the curable photochromic composition further comprises a prepolymer comprising a reaction product of (a) and (b).

7. The curable photochromic composition of claim 2, wherein the first compound and the second compound each independently comprise active hydrogen-functional groups chosen from hydroxyls, primary amines, secondary amines, thiols, or combinations thereof.

8. The curable photochromic composition of claim 2, wherein the second compound independently comprises polyol.

9. The curable photochromic composition of claim 8, wherein the polyol of the second compound comprises an acrylic polyol.

10. The curable photochromic composition of claim 1, wherein the at least one photochromic compound (c) is an organic photochromic material selected from photochromic spirooxazines, benzopyrans, naphthopyrans, indenonaphthopyrans, fulgides, metal dithizonates, diarylethenes, or combinations thereof.

11. The curable photochromic composition of claim 1, wherein when applied to a substrate and cured to form a coating, the first component forms a plurality of soft segment domains and the second component forms a plurality of hard segment domains.

12. The curable photochromic composition of claim 2, wherein when applied to a substrate and cured to form a coating, the first component forms a plurality of soft segment domains and the second component and the third component together form a plurality of hard segment domains.

13. The curable photochromic composition of claim 11, wherein the plurality of soft segment domains have a Tg of −10° C. to −150° C., and the plurality of hard segment domains have a Tg of 0° C. to 150° C.

14. The curable photochromic composition of claim 11, wherein the plurality of soft segment domains each comprise a size of less than 300 nm.

15. The curable photochromic composition of claim 11, wherein the plurality of soft segment domains each comprise a size of less than 100 nm.

16. The curable photochromic composition of claim 11, wherein the at least one photochromic compound (c) at least partially resides in the plurality of soft segment domains formed from the first component.

17. The curable photochromic composition of claim 12, wherein the plurality of soft segment domains have a Tg of −10° C. to −150° C., and the plurality of hard segment domains have a Tg of 0° C. to 150° C.

18. The curable photochromic composition of claim 12, wherein the plurality of soft segment domains each comprise a size of less than 300 nm.

19. The curable photochromic composition of claim 12, wherein the plurality of soft segment domains each comprise a size of less than 100 nm.

20. The curable photochromic composition of claim 12, wherein the at least one photochromic compound (c) at least partially resides in the plurality of soft segment domains formed from the first component.

21. The curable photochromic composition of claim 1, wherein when applied to a substrate and cured to form a coating, the coating exhibits a Fischer microhardness of at least 10 N/mm$^2$.

22. A photochromic article comprising:
(a) a substrate; and
(b) at least one coating layer formed from the curable photochromic composition of claim 1 residing over at least a portion of the substrate.

23. The photochromic article of claim 22, wherein the substrate is an optical substrate.

24. The photochromic article of claim 22, wherein the ratio of total isocyanate and blocked isocyanate group equivalents of the second component to total active hydrogen-functional groups equivalents of the first component is at least 5:1.

* * * * *